United States Patent Office 3,183,243
Patented May 11, 1965

3,183,243
ISOINDOLINONE DERIVATIVES
Glyn Evan Lee, Brentwood, and William Robert Wragg, Woodford Green, England, assignors to May & Baker Limited, Dagenham, England, a company of Great Britain
No Drawing. Filed July 19, 1962, Ser. No. 211,099
Claims priority, application Great Britain, July 28, 1961, 27,562/61; Jan. 8, 1962, 687/62
12 Claims. (Cl. 260—325)

This invention relates to new, therapeutically useful heterocyclic compounds, to processes for their preparation and to pharmaceutical compositions containing them.

According to the present invention, there are provided the new isoindolinone derivatives of the general formula:

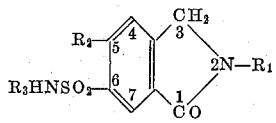

(I)

wherein $R_1$ represents a hydrogen atom, a lower alkyl group, a saturated cyclic or bicyclic hydrocarbon group containing 5 to 8 endocyclic carbon atoms optionally substituted by one or more lower alkyl groups, or a lower alkyl group substituted by a saturated cyclic or bicyclic hydrocarbon group containing 5 to 8 endocyclic carbon atoms optionally carrying one or more lower alkyl substituent groups, $R_2$ represents a halogen atom and $R_3$ represents a hydrogen atom or a lower alkyl group, and their alkali metal (preferably potassium) salts. The qualification "lower" as applied in this specification to alkyl groups means that the alkyl group contains not more than six carbon atoms. Preferred saturated cyclic or bicyclic hydrocarbon groups within the definition of $R_1$ are cyclopentyl, cyclohexyl, cycloheptyl, cyclo-octyl and 2,5-methanocyclohexyl; an example of an alkyl group substituted by a saturated cyclic hydrocarbon group within the definition of $R_1$ is the cyclohexylmethyl group.

The aforesaid isoindolinone derivatives have been found to possess valuable therapeutic properties, being particularly useful as diuretics, natriuretics and/or saluretics, and as useful adjuncts in the treatment of hypertension. Preferred compounds are those of general Formula I in which $R_1$ represents a substituent group, i.e. is other than a hydrogen atom, $R_2$ represents a chlorine atom, and $R_3$ represents a hydrogen atom or a methyl group, for example, 5-chloro-2-cyclohexyl-6-sulphamoylisoindolin-1-one,
5-chloro-2-cycloheptyl-6-sulphamoylisoindolin-1-one,
5-chloro-2-cyclo-octyl-6-sulphamoylisoindolin-1-one,
5-chloro-2-cyclopentyl-6-sulphamoylisoindolin-1-one,
5-chloro-2-(3-methylcyclohexyl)-6-sulphamoyl-
  isoindolin-1-one,
5-chloro-2-(4-methylcyclohexyl)-6-sulphamoyl-
  isoindolin-1-one,
5-chloro-2-(3,4-dimethylcyclohexyl)-6-sulphamoyl-
  isoindolin-1-one,
5-chloro-2-isobutyl-6-sulphamoylisoindolin-1-one,
5-chloro-2-cyclohexylmethyl-6-sulphamoyl-
  isoindolin-1-one,
5-chloro-2-(2,5-methanocyclohexyl)-6-sulphamoyl-
  isoindolin-1-one and
5-chloro-2-cyclohexyl-6-methylsulphamoyl-
  isoindolin-1-one.

According to a feature of the invention, the compounds of general Formula I are prepared by reduction of the substituted phthalimides of the general formula:

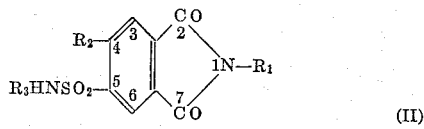

(II)

(wherein $R_1$, $R_2$ and $R_3$ are as hereinbefore defined) by methods known per se for the reduction of one of the carbonyl groups of phthalimide to a methylene group, for example, by treatment with tin and hydrochloric acid, or electrolytic reduction. When reduction of the phthalimide is effected with tin and hydrochloric acid, it may be carried out in an inert solvent medium, e.g. glacial acetic acid, or in a mixture of inert solvents (as is preferred), e.g. dimethylformamide and methanol. When reduction is effected electrolytically, it may be carried out in two stages; initially 3-hydroxyisoindolinones of the general formula:

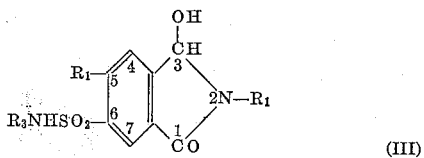

(III)

(wherein $R_1$, $R_2$ and $R_3$ are as hereinbefore defined) can be obtained, which on further reduction with, for example, tin and hydrochloric acid or electrolytically, give the required isoindolinone derivatives of general Formula I.

The phthalimide starting materials of general Formula II may be prepared by diazotisation of 5-amino-phthalimides of the general formula:

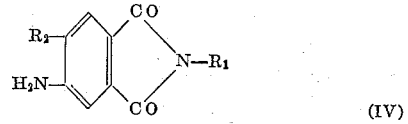

(IV)

by treatment with sodium nitrite in concentrated hydrochloric acid, reaction of the resulting diazonium compounds with sulphur dioxide in glacial acetic acid to give the corresponding sulphonyl chlorides of the general formula:

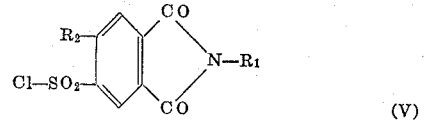

(V)

and reaction of the sulphonyl chlorides of Formula V with ammonia or an amine of the formula $R_3NH_2$, the symbols, $R_1$, $R_2$ and $R_3$ being as hereinbefore defined.

According to a further feature of the invention, the compounds of general Formula I are prepared by reaction of an isoindolinone-6-sulphonyl halide of the general formula:

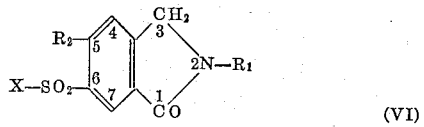

(VI)

(wherein X represents a halogen atom such as chlorine or bromine, and $R_1$ and $R_2$ are as hereinbefore defined) with ammonia or an amine of the formula $R_3NH_2$, $R_3$ being as hereinbefore defined.

The starting materials of general Formula VI may be conveniently prepared in a manner similar to that described above for the preparation of the compounds of general Formula V, i.e. by the diazotisation of compounds of the general formula:

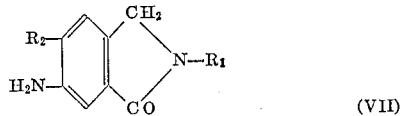

followed by the treatment of the diazonium salt solution with sulphur dioxide in glacial acetic acid. The diazotisation may be effected with, for example, sodium nitrite in concentrated hydrochloric acid.

The intermediates of general Formula VII may be conveniently prepared by the reduction of compounds of the general formula:

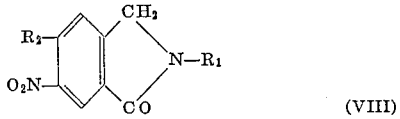

by methods known per se for the reduction of a nitro group to an amino group, for example, with stannous chloride in concentrated hydrochloric acid.

The intermediates of general Formula VIII may be conveniently prepared by the nitration of compounds of the general formula:

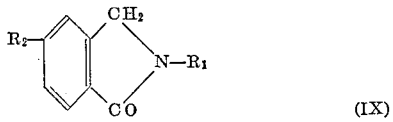

with, for example, potassium nitrate in concentrated sulphuric acid at 0° C.

According to a still further feature of the invention, the compounds of general Formula I, in which $R_1$ represents a cyclohexyl group, are prepared by the reduction of 2-cyclohexenyl-isoindolinones of the general formula:

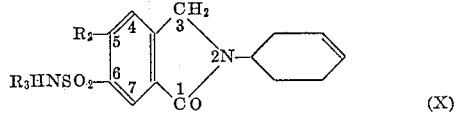

(wherein $R_2$ and $R_3$ are as hereinbefore defined) by methods known per se for the reduction of an ethylenic double bond, for example, by catalytic hydrogenation.

The intermediates of formula X may be prepared by reduction of phthalimide derivatives of the general formula:

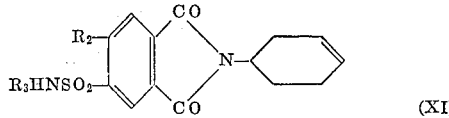

by methods known per se for the reduction of one of the carbonyl groups of phthalimide to a methylene group without affecting an ethylenic double bond, for example, by treatment with tin and hydrochloric acid.

The starting materials of Formula XI may be conveniently prepared by reaction of a substituted phthalimide of Formula II in which $R_1$ represents a hydrogen atom with 1-amino-cyclohex-3-ene.

It is within the scope of the present invention to prepare a compound of general Formula I by first preparing another of said compounds which has a substituent different from that desired and thereafter converting said substituent to the desired substituent. Thus, compounds of general Formula I in which $R_3$ represents a lower alkyl group can be prepared from the corresponding compounds in which $R_3$ represents a hydrogen atom by methods of alkylation known per se for the conversion of a primary sulphonamido group into an N-monoalkyl-sulphonamide group, e.g. by employing an alkylating agent in the form of a reactive ester such as dimethyl sulphate in the presence of alkali.

Alkali metal salts of the compounds of general Formula I may be obtained by dissolving the isoindolinone derivatives in the theoretical quantity of aqueous alkali and evaporating the solution to dryness.

By the term "methods known per se" as used in this specification and in the accompanying claims is meant methods heretofore employed or described in the chemical literature.

The following examples illustrate the invention.

*Example I*

4-chlorophthalimide (263 g.) was reacted in amyl alcohol (2.6 l.) with cyclohexylamine (143.5 g., 1 mole) at reflux temperature for 16 hours to give N-cyclohexyl-4-chlorophthalimide (250 g., 66%) as a solid, M.P. 134–136° C.

N-cyclohexyl-4-chlorophthalimide (250 g.) was dissolved in glacial acetic acid (2.5 l.), concentrated hydrochloric acid (555 ml.) and tin (278 g.) were added and the suspension was heated on a steam bath for 16 hours. The cooled solution was filtered and concentrated to dryness in vacuo to give a white solid. This solid was dissolved in water and the precipitated oil extracted with chloroform. The chloroform solution was dried and concentrated in vacuo to give a solid which, after recrystallisation, yielded 5-chloro-2-cyclohexylisoindolin-1-one (43%), M.P. 140–142° C.

5-chloro-2-cyclohexylisoindolin-1-one (102.9 g.) was dissolved in concentrated sulphuric acid (665 ml.); potassium nitrate (723 g.) in concentrated sulphuric acid (166 ml.) was added at 0° C. The reaction mixture was allowed to warm to room temperature and stirred at 25° C. for 12 hours. The reaction mixture was poured onto ice to give a cream solid, which, after recrystallisation from benzene, gave 5-chloro-2-cyclohexyl-6-nitroisoindolin-1-one (46.7 g.; 44%) as a white solid, M.P. 164–168° C.

5-chloro-2-cyclohexyl-6-nitroisoindolin-1-one (93.9 g.) was reduced in concentrated hydrochloric acid (1970 ml.) with stannous chloride (376 g.). The reaction temperature rose to 70° C. The resulting solution was cooled in ice and filtered. The product was washed well with water, filtered and dried to give 6-amino-5-chloro-2-cyclohexylisoindolin-1-one (74.1 g.; 87.6%) which, after recrystallisation from benzene, had a melting point of 216–218° C.

6 - amino-5-chloro-2-cyclohexylisoindolin-1-one (42.5 g.) was dissolved in concentrated hydrochloric acid (425 ml.) and the solution diazotised by the addition of sodium nitrite (21.25 g.) in water (125 ml.). The resulting diazonium salt solution was added to a solution of liquid sulphur dioxide (93 ml.) in glacial acetic acid (243 ml.) containing cuprous chloride (2.25 g.). A yellow solid was precipitated; this was filtered off, washed, dried and recrystallised from benzene to give 5-chloro-2-cyclohexyl-isoindolin-1-one-6-sulphonyl chloride (45 g.; 80%) as a cream solid, M.P. 171–174° C.

This sulphonyl chloride (23.7 g.) was reacted with liquid ammonia (237 ml.) to give 5-chloro-2-cyclohexyl-6-sulphamoylisoindolin-1-one (14.2 g., 53%), M.P. 259–261° C.

*Example II*

N-cyclohexyl-4-chloro-5-sulphamoylphthalimide (34.25 g.) was dissolved in glacial acetic acid (342.5 ml.) on a steam bath. Concentrated hydrochloric acid (57 ml.) was added followed by granulated tin (28.5 g.). The suspension was stirred and heated on a steam bath for 18 hours. The suspension was evaporated to dryness, extracted with cold water (600 ml.) and filtered. The insoluble residue was dissolved in 2 N sodium hydroxide (50 ml.), filtered and poured into 2 N hydrochloric acid (100 ml.). The white precipitate was filtered off, washed with water and dried at 60° C., to give a solid (28.4 g.) M.P. 247–253° C. After recrystallisation from methanol, 5 - chloro-2-cyclohexyl-6-sulphamoylisoindolin-1-one was obtained, M.P. 259–261° C.

N - cyclorhexyl-4-chloro-5-sulphamoylphthalimide employed as starting material was prepared as follows:

4-chloro-5-aminophthalimide (19 g.) was reacted in refluxing amyl alcohol (70 ml.) with cyclohexylamine (9.6 g.) for 7 hours. The cold solution was filtered and the residue recrystallised from ethanol give N-cyclohexyl-4-chloro-5-aminophthalimide, M.P. 249–250° C.

N-cyclohexyl-4-chloro-5-amino-phthalimide (9.0 g.) was diazotised (sodium nitrite 2.6 g.) in concentrated hydrochloric acid (90 ml.). The diazonium solution was poured into a solution of sulphur dioxide (11.2 ml.) in glacial acetic acid (35 ml.) containing cuprous chloride (0.1 g.). The suspension was allowed to stand for 1 hour and filtered. The residue was washed with water and dried to give N-cyclohexyl-4-chloro-5-chlorosulphonylphthalimide, M.P. 141–150° C.

N - cyclohexyl-4-chloro-5-chlorosulphonylphthalimide (9.2 g.) was added to liquid ammonia (92 ml.). The solution was evaporated to dryness and the crude solid was heated at 100° C. with concentrated hydrochloric acid (20 ml.). The suspension was cooled, filtered and the residue washed with water and dried. Recrystallisation from methanol gave N-cyclohexyl-4-chloro-5-sulphamoylphthalimide, M.P. 209–212° C.

Proceeding in a similar manner to that described above, the named starting materials were reduced to the stated products:

N-cyclopentyl-4-chloro-5-sulphamoylphthalimide to 5-chloro-2-cyclopentyl-6-sulphamoylisoindolin-1-one, M.P. 281–285° C.;

N-cycloheptyl-4-chloro-5-sulphamoylphthalimide to 5-chloro-2-cycloheptyl-6-sulphamoylisoindolin-1-one, M.P. 261–262° C.;

N-cyclooctyl-4-chloro-5-sulphamoylphthalimide to 5-chloro - 2-cyclooctyl-6-sulphamoylisoindolin-1-one, M.P. 252–253° C.;

N - (4-methylcyclohexyl)-4-chloro-5-sulphamoylphthalimide to 5-chloro-2-(4-methylcyclohexyl)-6-sulphamoylisoindolin-1-one, M.P. 265–270° C.;

N - (3-methylcyclohexyl)-4-chloro-5-sulphamoylpthalimide to 5-chloro-2-(3-methylcyclohexyl)-6-sulphamoylisoindolin-1-one, M.P. 245–250° C.;

N - (3,4-dimethylcyclohexyl)-4-chloro-5-sulphamoylphthalimide to 5-chloro-2-(3,4-dimethylcyclohexyl)-6-sulphamoylisoindolin-1-one, M.P. 274–276° C.;

N - cyclohexylmethyl-4-chloro-5-sulphamoylphthalimide to 5-chloro-2-cyclohexylmethyl-6-sulphamoylisoindolin-1-one, M.P. 220–222° C.;

N - cyclohexyl-4-chloro-5-metyhlsulphamoylphthalimide to 5-chloro-2-cyclohexyl-6-methylsulphamoylisoindolin-1-one, M.P. 233–234° C.;

N - (2,5 - methanocyclohexyl)-4-chloro-5-sulphamoylphthalimide to 5-chloro-2-(2,5-methanocyclohexyl)-6-sulphamoylisoindolin-1-one, M.P. 274–275° C.;

N-isobutyl-4-chloro-5-sulphamoylphthalimide to 5-chloro-2-isobutyl-6-sulphamoylisoindolin-1-one, M.P. 242–243° C.; and 4-chloro-5-sulphamoylphthalimide to 5-chloro-6-sulphamoylisoindolin-1-one, M.P. >350° C.

*Example III*

A solution of N-cyclohexyl-4-chloro-5-sulphamoylphthalimide (2 g.) (prepared as described in Example II) in methanol (100 ml.) and 5 N sulphuric acid (20 ml.) was electrolysed at 25–35° C. in a glass beaker using a lead cathode and a carbon rod or anode at a current density of 0.03 ampere per square cm. and a cathode potential of −0.7 volt relative to a saturated calomel electrode. The lead cathode is arranged around the periphery of the vessel and the carbon anode is a rod enclosed in a sausage-skin bag. (Immediately prior to use the lead cathode is physically cleaned and degreased and repeatedly oxidised and reduced for 10 minute periods in 5 N sulphuric acid using aluminium as the other electrode.) A solid is precipitated and the precipitation is usually complete after the passage of 42 coulombs (i.e. after about 20 minutes). The precipitate, which is collected by filtration, is a mixture of 5-chloro-2-cyclohexyl-6-sulphamoylisoindolin-1-one and the sulphamoylphthalimide used as starting material. The filtrate contains 5-chloro-2-cyclohexyl - 3-hydroxy-6-sulphamoylisoindolin-1-one. The two components of the precipitate are separated by dissolving the mixture in cold 2 N sodium hydroxide, filtering and treating the filtrate with an excess of 2 N hydrochloric acid, when crude 5-chloro-2-cyclohexyl-6-sulphamoylisoindolin-1-one separates. After recrystallisation from methanol, 5-chloro-2-cyclohexyl-6-sulphamoylisoindolin-1-one (0.2 g.; 10%) was obtained as a white solid, M.P. 259–261° C.

*Example IV*

A solution of 5-chloro-2-cyclohexyl-3-hydroxy-6-sulphamoylisoindolin-1-one (1 g.) (prepared as described in Example III) in methanol (50 ml.) and 5 N sulphuric acid (20 ml.) was electrolysed at 25–35° C. in a glass beaker using a mercury cathode and a carbon rod as anode at a current density of 0.1 ampere per square cm. and a cathode potential of −1.25 volts relative to a saturated calomel electrode. The carbon anode takes the form of a rod enclosed in a sausage-skin bag. A solid was precipitated and the precipitation is usually complete after 70 minutes. The precipitate, which was collected by filtration, was crude 5-chloro-2-cyclohexyl-6-sulphamoylisoindolin-1-one (0.55 g., 65%). After recrystallisation from methanol, 5-chloro-2-cyclohexyl-6-sulphamoylisoindolin-1-one was obtained as a white solid, M.P. 268–270° C.

*Example V*

N-cyclohexyl-4-chloro-5-sulphamoylphthalimide (1000 g.) (prepared as described in Example II) was dissolved in a mixture of dimethylformamide (5.65 litres) and methanol (5.65 litres). Granulated tin (835 g.) and then concentrated hydrochloric acid (3.45 litres) was added. Some heat was applied from a steam bath to the stirred reaction mixture when a fairly exothermic reaction started. The reaction mixture was stirred at gentle reflux for 3 hours. The reaction solution was decanted away from tin residues and concentrated in vacuo on a steam bath until crystallisation started. Concentrated hydrochloric acid (2.5 litres) was added with stirring and the suspension cooled and filtered. The solid was washed with hydrochloric acid and water. The still damp solid was dissolved in 2 N sodium hydroxide (2 litres), the solution diluted with water (2 litres) and poured into rapidly stirred 2 N hydrochloric acid (3 litres). After stirring for 1 hour, the solid was filtered off and washed with water. The product was dried at 80° C. to give a white solid which was recrystallised from a 50/50 mixture of dimethylformamide and methanol to give 5-chloro-2-cyclohexyl-6-sulphamoylisoindolin-1-one (548 g., 55.5%) as a white solid, M.P. 264–268° C. A further recrystallisation from the same solvent mixture raised the melting point to 266–268° C.

*Example VI*

5 - chloro - 2 - cyclohexyl - 3 - hydroxy - 6 - sulphamoylisoindolin-1-one (10 g.) (prepared as described in Example III) was dissolved in a mixture of dimethylformamide (56 ml.) and methanol (56 ml.). Concentrated hydrochloric acid (34 ml.) followed by tin (8.5 g.) was added. The suspension was stirred and heated on a steam bath for 18 hours. The mixture was filtered and the filtrate concentrated in vacuo. The residue was treated with concentrated hydrochloric acid (100 ml.). The precipitated solid was filtered off and washed with further concentrated hydrochloric acid (100 ml.). The solid was dissolved in 2 N sodium hydroxide (50 ml.) and the resulting solution poured into 2 N hydrochloric acid (100 ml.). The precipitated solid was filtered off, dried and recrystallised from dimethylformamide/methanol to give 5-chloro-2-cyclohexyl-6-sulphamoylisoindolin-1-one (4.7 g.), M.P. 259–261° C.

The present invention further includes within its scope pharmaceutical compositions which comprise one or more compounds of general Formula I, or alkali metal salts thereof, together with a significant amount of a pharmaceutical carrier. In clinical practice the compounds of the present invention will normally be administered orally so that compositions suitable for oral administration are preferred.

Solid compositions for oral administration include compressed tablets, pills, dispersible powders and granules.

In such solid compositions one or more of the active substances is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions and suspensions containing inert diluents commonly used in the art, such as water and liquid paraffin. Besides inert diluents, such compositions may also comprise adjuvants, such as wetting and suspending agents, and sweetening and flavouring agents. The compositions according to the invention for oral administration also include capsules of absorbable material such as gelatin containing one or more of the active substances with or without the addition of diluents or excipients.

The percentage of active ingredient in the compositions of the invention may be varied, it being necessary that it should constitute a proportion such that a suitable dosage shall be obtained. Obviously several unit dosage forms may be administered at about the same time and the optimum dosage form will vary from patient to patient. In general, the preparations of the present invention should normally contain at least 0.1% by weight of active substance in the case of oral preparations.

The following example illustrates pharmaceutical compositions according to the invention:

*Example VII*

Tablets containing 0.05 g. of active material were prepared according to the following procedure.

Ingredients: G.
5 - chloro - 2 - cyclohexyl - 6 - sulphamoylisoindolin-1-one _____ 7.4
Lactose _____ 12.4
Polyethylene glycol 6000 _____ 8.0
Tragacanth _____ 0.4
Sucrose _____ 0.3
Talc _____ 1.0
Magnesium stearate _____ 0.1
Distilled water and ethanol, q.s.

The isoindolinone, tragacanth, lactose, sucrose, talc and magnesium stearate were passed through a 20-mesh British Standard sieve and mixed for 20 minutes. The polyethylene glycol was dissolved in a mixture of water (2.0 ml.) and ethanol (2.0 ml.). The mixed powders were wetted with this solution, the moist mass passed through a 10-mesh sieve and then dried at 40° C. with circulating air until the moisture content was about 2 to 3%. The granules were broken on a 16-mesh sieve and compressed into tablets of 0.20 g. weight by using $^{10}\!/_{32}''$ punches and dies.

We claim:
1. 5-chloro-2-cyclohexyl-6-sulphamoylisoindolin-1-one.
2. 5-chloro-2-cycloheptyl-6-sulphamoylisoindolin-1-one.
3. 5-chloro-2-cyclo-octyl-6-sulphamoylisoindolin-1-one.
4. 5-chloro-2-cyclopentyl-6-sulphamoylisoindolin-1-one.
5. 5-chloro-2-(3-methylcyclohexyl)-6-sulphamoylisoindolin-1-one.
6. 5-chloro-2-(4-methylcyclohexyl)-6-sulphamoylisoindolin-1-one.
7. 5 - chloro - 2 - (3,4 - dimethylcyclohexyl) - 6 - sulphamoylisoindolin - 1 - one.
8. 5-chloro-2-isobutyl-6-sulphamoylisoindolin-1-one.
9. 5 - chloro - 2 - cyclohexylmethyl - 6 - sulphamoylisoindolin - 1 - one.
10. 5 - chloro - 2 - (2,5 - methanocyclohexyl) - 6 - sulphamoylisoindolin - 1 - one.
11. 5 - chloro - 2 - cyclohexyl - 6 - methylsulphamoylisoindolin - 1 - one.
12. A compound selected from the group consisting of compounds of the formula:

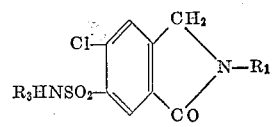

wherein $R_1$ represents a member of the class consisting of alkyl of up to 6 carbon atoms, unsubstituted saturated monocyclic hydrocarbon of 5 to 8 carbon atoms, unsubstituted saturated bicyclic hydrocarbon of 5 to 8 carbon atoms, saturated monocyclic hydrocarbon of 5 to 8 carbon atoms substituted by one alkyl of up to 6 carbon atoms, alkyl of up to 6 carbon atoms substituted by an unsubstituted saturated monocyclic hydrocarbon of 5 to 8 carbon atoms, and $R_3$ represents a member of the class consisting of hydrogen and methyl, and alkali metal salts thereof.

References Cited by the Examiner

UNITED STATES PATENTS 2,846,382  8/58  Allen _____ 204—75
2,857,396  10/58  Wheeler et al. _____ 260—325
2,964,533  12/60  Van der Crane _____ 260—325
3,004,889  10/61  Kuna et al. _____ 167—65
3,024,166  3/62  Kuna et al. _____ 167—65

OTHER REFERENCES

Burger: Medicinal Chemistry, second edition, Interscience Publishers, Inc., New York, 1960, pages 567–571.

Fieser et al.: Advanced Organic Chemistry, Reinhold Publishing Corp., New York, 1961, pages 699 and 706–707.

Rice et al.: J. Org. Chem., volume 19, pages 884–890 (1954).

Sakurai: Bull. Chem. Soc. Japan, volume 5, pages 184–189 (1930), abstracted in Chem. Abstracts, volume 24, p. 5643⁹, 1930.

Wertheim: Textbook of Organic Chemistry, second ed., Blakiston Co., Philadelphia, Pa., 1945, pages 763–764.

NICHOLAS S. RIZZO, *Primary Examiner.*

DUVAL T. McCUTCHEN, *Examiner.*